United States Patent [19]

Ono

[11] Patent Number: 4,849,631

[45] Date of Patent: Jul. 18, 1989

[54] APPARATUS FOR RECORDING, READING AND REPRODUCING RADIATION IMAGE INFORMATION

[75] Inventor: Shuji Ono, Kanagawa, Japan

[73] Assignee: Fuji Photo Film Co., Ltd., Kanagawa, Japan

[21] Appl. No.: 182,657

[22] Filed: Apr. 18, 1988

[30] Foreign Application Priority Data

Apr. 17, 1987 [JP] Japan .................................. 62-94821
Apr. 17, 1987 [JP] Japan .................................. 62-94824

[51] Int. Cl.$^4$ ............................................... G03C 5/16
[52] U.S. Cl. ................................ 250/327.2; 250/484.1
[58] Field of Search .................... 250/327.2, 328, 329, 250/354.1, 484.1

[56] References Cited

U.S. PATENT DOCUMENTS

| 4,629,891 | 12/1986 | Nakajima et al. | 250/327.2 |
| 4,636,641 | 1/1987 | Mori et al. | 250/327.2 |
| 4,771,174 | 9/1988 | Torjii | 250/372.2 |
| 4,774,409 | 9/1988 | Yamamoto | 250/327.2 |

Primary Examiner—Janice A. Howell
Assistant Examiner—Jacob M. Eisenberg
Attorney, Agent, or Firm—Sughrue, Mion, Zinn, Macpeak & Seas

[57] ABSTRACT

An apparatus for recording, reading, and reproducing radiation image information, the apparatus includes a recording unit for recording radiation image information from an object on an endless recording medium, a readng unit for photoelectrically reading the recorded radiation image information from the recording medium by applying stimulating light to the recording medium, and a reproducing unit for applying a light beam modulated by the radiation image thus read on a recording sheet such as a photographic photosensitive material to reproduce the image as a visible image on the recording sheet. The recording medium and the recording sheet are fed by a common feed system in auxiliary scanning directions, respectively. The reading and reproducing units may share a common optical system.

10 Claims, 5 Drawing Sheets

APPARATUS FOR RECORDING, READING AND REPRODUCING RADIATION IMAGE INFORMATION

BACKGROUND OF THE INVENTION

The present invention relates to an apparatus for recording, reading, and reproducing radiation image information, and more particularly to an apparatus for recording, reading, and reproducing radiation image information wherein a recording medium composed of a stimulable phosphor layer fixed to an endless support member is circulated for recording a radiation image thereon, the radiation image recorded on the recording medium is photoelectrically read by exposure to stimulating light, and while a recording sheet is being fed in an auxiliary scanning direction by a simple feed means, a light beam modulated by the radiation image thus read or other image information and deflected in a main scanning direction is applied to the recording sheet to reproduce the image as a visible image.

There has recently been developed and widely used, particularly in the medical field, a radiation image recording and reproducing system for producing the radiation-transmitted image of an object using a stimulable phosphor material capable of emitting light upon exposure to stimulating rays When a certain phosphor is exposed to a radiation such as X-rays, α-rays, β-rays, γ-rays, cathode rays, or ultraviolet rays, the phosphor stores a part of the energy of the radiation. When the phosphor exposed to the radiation is subsequently exposed to stimulating rays such as visible light, the phosphor emits light in proportion to the stored energy of the radiation. The phosphor exhibiting such a property is referred to as a "stimulable phosphor".

In the radiation image recording and reproducing system employing such a stimulable phosphor, the radiation image information of an object such as a human body is stored in a sheet having a layer of stimulable phosphor, and then the stimulable phosphor sheet is scanned with stimulating rays such as a laser beam to cause the stimulable phosphor sheet to emit light representative of the radiation image. The emitted light is then photoelectrically detected to produce an image information signal that is electrically processed for generating image information which is recorded as a visible image on a recording medium such as a photosensitive material or displayed as a visible image on a CRT or the like.

The radiation image recording and reproducing system includes an image reading device for reading the radiation image recorded on a stimulable phosphor sheet. The image reading device reads the radiation image recorded on a stimulable phosphor sheet as follows:

The stimulable phosphor sheet is two-dimensionally scanned by a light beam such as a laser beam, and light emitted from the stimuable phosphor sheet in response to application of the light beam is detected in time series by a light detector such as a photomultiplier or the like, for thereby obtaining image information. The two-dimensional scanning of the stimulable phosphor sheet with the light beam is effected by mechanially feeding, with the light beam is effected by mechanically feeding, sheet in one direction for auxiliary scanning, while deflecting the light beam for main scanning in a direction normal to the direction in which the stimulable phosphor sheet is fed.

The image information thus obtained is sent to an image reproducing device. In the image reproducing device, a recording sheet such as a photographic photosensitive material is exposed to a laser beam modulated by the image information produced from the stimulable phosphor sheet for thereby recording an image on the photographic photosensitive material.

In the radiation image recording and reproducing system, the stimulable phosphor sheet does not serve as a final image information storage medium, but only temporarily stores radiation image information until the radiation image information will be transferred onto and reproduced on the recording sheet as described above. After the stored radiation image information has been read from the stimulable phosphor sheet upon exposure to stimulating light, any radiation energy remaining on the stimulable phosphor sheet is discharged by a method disclosed in Japanese Laid-Open Patent Publication No. 56-11392 or 56-12599 so that undesired remaining radiation image will be erased from the stimulable phosphor sheet. Thereafter, the stimulable phosphor sheet can be used again for recording a radiation image thereon. As a result, the stimulable phosphor sheet is highly economical since it can repeatedly be used in the image reading device.

There has been proposed a radiation image information recording and reading apparatus in which a recording medium composed of a stimulable phosphor layer fixed to an endless support member is circulated for recording a radiation image of an object, the radiation image recorded on the recording medium is photoelectrically read by exposure to stimulating light, and thereafter remaining radiation image information on the recording medium is erased by exposure to erasing light, so that the recording medium can cyclically be reused for recording a radiation image of an object again (see Japanese Laid-Open Patent Publication No. 58-200269).

The endless recording medium is free of the problem of a sheet jam which would otherwise be caused in a sheet feed system by the use of separate sheets such as stimulable phosphor sheets. Another advantage of the proposed apparatus is that the feed system is simple in structure and the overall size of the apparatus is reduced.

SUMMARY OF THE INVENTION

It is a general object of the present invention to provide an apparatus for recording, reading, and reproducing radiation image information, the apparatus including a recording unit for recording radiation image information from an object on an endless recording medium, a reading unit for photoelectrically reading the recorded radiation image information from the recording medium by applying stimulating light to the recording medium, and a reproducing unit for applying a light beam modulated by the radiation image thus read on a recording sheet such as a photographic photosensitive material to reproduce the image as a visible image on the recording sheet, the recording medium and the recording sheet being fed by one driving system for auxiliary scanning thereby to effect an efficient process of recording, reading, and reproducing radiation image information, the apparatus also including a simple feed system and being small in size and economical to manufacture.

Another object of the present invention is to provide an apparatus for recording, reading, and reproducing radiation image information, comprising a recording medium composed of an endless support member and a stimulable phosphor layer fixed thereto, recording means for applying a radiation bearing image information to the recording medium while in circulatory motion to record the image information on the recording medium, reading means for applying a light beam to the recording medium with the image information recorded thereon while deflecting the light beam in a main scanning direction and for photoelectrically reading the image information, erasing means for applying erasing light to the recording medium from which the image information has been read to erase remaining image information from the recording medium, reproducing means for applying a light beam modulated by the image information or other radiation image information to a recording sheet while deflecting the light beam in a main scanning direction to reproduce an image on the recording sheet, and an auxiliary scanning feed system for feeding the recording medium scanned in the main scanning direction by the reading means and the recording sheet scanned in the main scanning direction by the reproducing means, respectively in different first and second auxiliary scanning directions transverse to the main scanning directions.

Still another object of the present invention is to provide an apparatus for recording, reading, and reproducing radiation image information, wherein the auxiliary scanning feed system includes a rotatable drive drum, a pair of first nip rollers coacting with the drive drum for gripping and feeding the recording medium in the first auxiliary scanning direction, and a pair of second nip rollers coacting with the drive drum for gripping and feeding the recording sheet in the second auxiliary scanning direction different from the first auxiliary scanning direction.

Yet another object of the present invention is to provide an apparatus for recording, reading, and reproducing radiation image information, wherein at least the first nip rollers are movable toward and away from the drive drum.

Yet still another object of the present invention is to provide an apparatus for recording, reading, and reproducing radiation image information, wherein the reading means and the reproducing means share a common optical system.

A further object of the present invention is to provide an apparatus for recording, reading, and reproducing radiation image information, wherein the stimulable phosphor sheet is fixed to an inner peripheral surface of the endless support member, the support member being made of a material which is permeable to the radiation and impermeable to the light beam.

A still further object of the present invention is to provide an apparatus for recording, reading, and reproducing radiation image information, comprising a recording medium composed of an endless support member and a stimulable phosphor layer fixed thereto, recording means for applying a radiation bearing image information to the recording medium while in circulatory motion to record the image information on the recording medium, reading means for applying a light beam to the recording medium with the image information recorded thereon while deflecting the light beam in a main scanning direction and for photoelectrically reading the image information, erasing means for applying erasing light to the recording medium from which the image information has been read to erase remaining image information from the recording medium, and reproducing means for applying a light beam modulated by the image information or other radiation image information to a recording sheet while deflecting the light beam in a main scanning direction to reproduce an image on the recording sheet, the recording sheet being fed in an auxiliary scanning direction transverse to the last-mentioned main scanning direction by the recording medium while in circulatory motion.

A yet further object of the present invention is to provide an apparatus for recording, reading, and reproducing radiation image information, further including a pair of feed drive rollers held in contact with opposite surfaces of the recording medium, one of the feed drive rollers and the recording medium coacting with each other for feeding the recording sheet in the auxiliary scanning direction.

A yet still further object of the present invention is to provide an apparatus for recording, reading, and reproducing radiation image information, wherein the reading unit and the reproducing unit are arranged to apply the light beams emitted respectively therefrom to the recording medium and the recording sheet at positions substantially equally spaced from the drive rollers, respectively.

Another object of the present invention is to provide an apparatus for recording, reading, and reproducing radiation image information, wherein the reading means and the reproducing means share a common optical system.

Still another object of the present invention is to provide an apparatus for recording, reading, and reproducing radiation image information, wherein the support member is made of a light-shielding material.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 1:
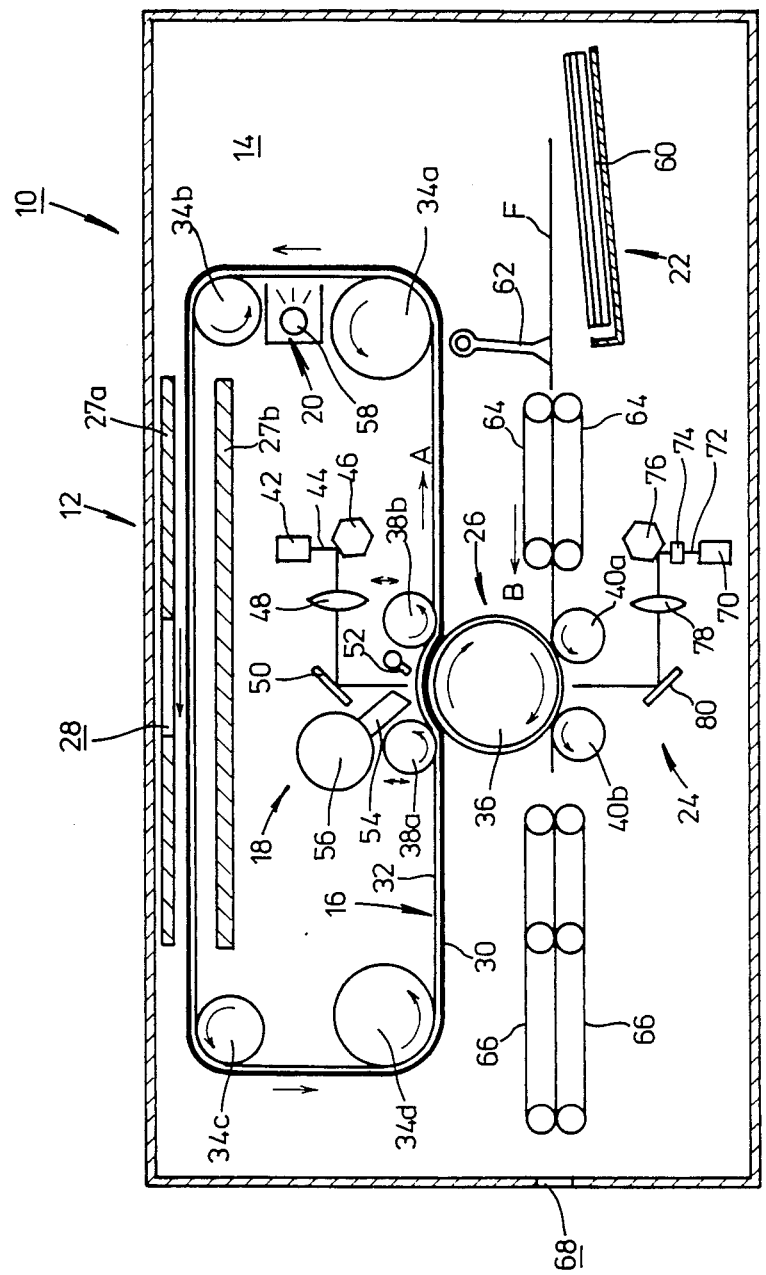
FIG. 1 is a schematic sectional elevational view of an apparatus for recording, reading, and reproducing radiation image information according to the present invention.

FIG. 1 shows an apparatus 10 for recording, reading, and reproducing radiation image information according to the present invention. The apparatus 10 essentially comprises a recording unit 12 disposed in an upper portion of the apparatus for recording a radiation image, an endless recording medium 16 disposed in a chamber 14 and movable in a circulatory path for storing radiation image information thereon, a reading unit 18 disposed inwardly of the recording medium 16 for photoelectrically reading the radiation image information from the recording medium 16, an erasing unit 20 disposed inwardly of the recording medium 16 for erasing remaining radiation image from the recording medium 16, a supply unit 22 positioned outwardly of the recording medium 16 for supplying a recording sheet F such as an unexposed film, a reproducing unit 24 for reproducing an image on the film F, and an auxiliary scanning feed system 26 for feeding the recording medium 16 and the film F together in an auxiliary scanning direction while the recording medium 16 and the film F are being scanned in a main scanning direction normal to the auxiliary scanning direction.

The construction of the apparatus 10 will be described below in greater detail.

In the chamber 14, there is disposed a pair of radiation shield plates 27a, 27b made of lead or the like which is positioned in the recording unit 12 in sandwiching relation to the recording medium 16. The shield plate 27a has an opening 28 defined therein for allowing a radiation such as X-rays bearing image information to be applied therethrough to the recording medium 16.

The recording medium 16 includes a support member 30 in the form of an endless belt, the support member 30 being made of a material which can pass the radiation therethrough but blocks or is impermeable to a laser beam (described later). The recording medium 16 also includes a stimulable phosphor layer 32 fixed to an inner peripheral surface of the support member 30.

The recording medium 16 is trained around four rollers 34a through 34d positioned respectively at the corners of a rectangular shape. The auxiliary scanning feed system 26 is disposed below the recording medium 16.

The auxiliary scanning feed system 26 includes a large-diameter drive drum 36 rotatable about its own axis by a rotative drive source (not shown). The drive drum 36 is positioned outwardly of the recording medium 16 and held in rolling contact with the support member 30 of the recording medium 16. A pair of nip rollers 38a, 38b spaced from each other is disposed inwardly of the recording medium 16, the nip rollers 38a, 38b being displaceable in the directions of the arrows. The recording medium 16 is sandwiched between the drive drum 36 and the nip rollers 38a, 38b. The nip rollers 38a, 38b coact with the drive drum 36 to feed the recording medium 16 in an auxiliary scanning direction (indicated by the arrow A).

Another pair of nip rollers 40a, 40b spaced from each other is positioned beneath the drive drum 36 in rolling contact therewih. The film F is sandwiched between the drive drum 36 and the nip rollers 40a, 40b. The nip rollers 40a, 40b coact with the drive drum 36 to feed the film F in an auxiliary scanning direction (indicated by the arrow B).

The reading unit 18 is disposed above the nip rollers 38a, 38b. The reading unit 18 includes a laser beam source 42 for emitting a laser beam 44, a polygonal mirror 46 angularly movable for deflecting the laser beam 44, a scanning lens 48 such as an fθ lens, a reflecting lens 50, and a converging reflecting mirror 52. A light guide 54 is disposed in a position where the recording medium 16 is scanned by the laser beam 44, the light guide 54 extending along a main scanning line. A photomultiplier 56 is mounted on the upper end of the light guide 54.

The erasing unit 20 is disposed between the rollers 34a, 34b, the erasing unit 20 having an erasing light source 58 therein.

The supply unit 22 is positioned in a righthand portion of the chamber 14 and includes a detachable supply magazine 60. The supply magazine 60 stores a stack of unexposed films F which can be taken, one at a time, out of the magazine 60 by a sheet feed mechanism including a swingable suction cup 62. A pair of first feed belts 64 each in the form of an endless belt is disposed near the suction cup 62. The first feed belts 64 extend horizontally and have ends located near the nip roller 40a of the auxiliary scanning feed system 26. A pair of first feed belts 66 each in the form of an endless belt is disposed near the nip roller 40b for feeding the film F through an outlet slot 68 defined in a side wall of the apparatus 10 toward an automatic developing apparatus. A suitable light-shielding means (not shown) is associated with the outlet slot 68 for preventing extraneous light from entering the apparatus 10 through the outlet slot 68.

The reproducing unit 24 is positioned below the nip rollers 40a, 40b. The reproducing unit 24 is substantially identical in structure to the reading unit 18. The reproducing unit 24 basically comprises a laser beam source 70 for emitting a laser beam 72, a light modulator 74 for modulating the laser beam 72, a polygonal mirror 72 for deflecting the modulated laser beam 72, a scanning lens 47 for scanning the laser beam 72 over the film F, and a reflecting mirror 80.

The apparatus 10 for recording, reading, and reproducing radiation image information according to the present invention is essentially constructed as described above. Operation and advantages of the apparatus 10 will now be described below.

In the recording unit 12, an object (not shown) to be imaged is exposed to a radiation such as X-rays. The radiation which has passed through the object and bears image information of the object is then applied through the opening 28 to the stimulable phosphor sheet 32 of the recording medium 16 to record a radiation image thereon. The drive drum 36 is rotated in the direction of the arrow by the rotative drive source to feed the recording medium 16 through the circulatory path in the direction of the arrow A in coaction with the nip rollers 38a, 38b.

When the area of the recording medium 16 in which the radiation image is recorded reaches a position below the reading unit 18, the laser beam source 42 of the reading unit 18 is energized to emit the laser beam 44, which is deflected by the rotating polygonal mirror 46 and applied via the scanning lens 48 and the reflecting mirror 50 to the recording medium 16 while being scanned in the main scanning direction. Light, bearing the recorded radiation image, which is emitted from the stimulable phoshpor layer 32 upon exposure to the laser beam 44 enters the light guide 54 directly or via the reflecting mirror 52, and is then converted to an electric signal by the photomultiplier 56. During this time, the recording medium 16 is fed in the auxiliary scanning direction of the arrow A while being gripped between the drive drum 36 and the nip rollers 38a, 38b. Therefore, the recording medium 16 is two-dimensionally scanned by the laser beam 44.

Then, when the area of the recording medium 16 from which the radiation image has been read reaches the erasing unit 20 between the rollers 34a, 34b, the erasing light source 58 is energized to erase any remaining radiation image from the simulable phosphor layer 32 at that area.

The recording unit 12 is successively taking radiation images of the object or other objects. Therefore, such successive radiation images, closely or at spaced intervals, are recorded on the stimulable phosphor layer 32, and are then successively photoelectrically read by the reading unit 18. A visible image is formed on a film F based on an image signal read by the reading unit 18 or an image signal read by another reading unit (not shown).

More specifically, the unexposed films F are taken, one at a time, out of the supply magazine 60 in the supply unit 22 by the suction cup 62 of the sheet feed mechanism. The film F from the supply magazine 60 is delivered to the first feed belts 64, and then fed into the auxiliary scanning feed system 26 by being gripped between the first feed belts 64. Thereafter, the film F is gripped between the drive drum 36 and the nip rollers 40a, 40b and fed in the auxiliary scanning direction of the arrow B at a given speed. At the same time, the laser beam source 70 of the reproducing unit 24 is energized.

The laser beam 72 emitted from the laser beam source 70 is modulated by the light modulator 74 and deflected by the polygonal mirror 76. The deflected laser beam 72 is applied to the film F fed in the auxiliary scanning direction, via the scanning lens 78 and the reflecting mirror 80 while being scanned in the main scanning direction. Accordingly, the image of the object When no radiation image is to be read, the recording medium 16 can be held at rest by displacing the nip rollers 38a, 38b away from the drive drum 36.

The film F with the image reproduced thereon passes through the reproducing unit 24 and is delivered by the second feed belts 66 via the outlet slot 68 to the automatic developing apparatus in which the image is developed in a suitable manner.

In the above embodiment, the endless recording medium 16 with the stimulable phosphor layer 32 is circulated in the apparatus 10 while radiation images are being successively recorded in the recording unit 12 and read in the reading unit 18. The recording medium 16 and the unexposed film F are fed in the respective auxiliary scanning directions indicated by the respective arrows A, B by the common auxiliary scanning feed system 26. Therefore, the auxiliary scanning feed system 26 is much simpler in structure than would if the recording medium 16 and the unexposed film F were fed in the respective auxiliary scanning directions of the arrows A, B by respective separate feed systems. As a result, the apparatus 10 is small in size and can be manufactured economically.

The apparatus 10 has the reading unit 18 and the reproducing unit 24 therein so that radiation images can be simultaneously read from the stimulable phosphor layer 32 and reproduced on the unexposed film F. The process of recording a radiation image of an object in the recording unit 12 and reproducing image information of the same object can thus be greatly shortened. Consequently, the process of recording, reading, and reproducing radiation image information can be effected highly efficiently.

In the embodiment of FIG. 1, the reading unit 18 and the reproducing unit 24 are independent of each other. However, they may be arranged o share a common optical system as shown in FIG. 2.

Figure 2:
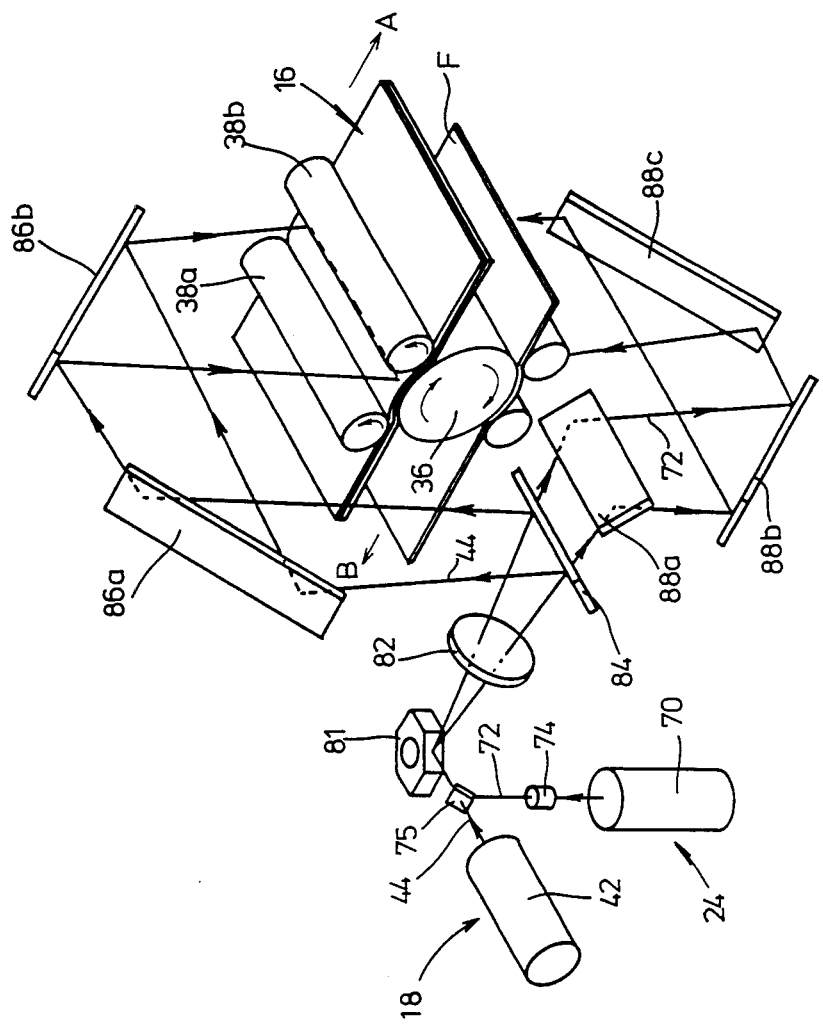
FIG. 2 is a perspective view of another scanning system which can be incorporated in the apparatus.

In FIG. 2, the laser beam sources 42, 70 of the reading unit 18 and the reproducing unit 24 emit laser beams of different wavelengths. The laser beam 44 emitted from the laser beam source 42 and the laser beam 72 emitted from the laser beam source 70 are applied to a common dichroic mirror 75 which passes the laser beam 44 therethrough but reflects the laser beam 72. The light modulator 72 is positioned on the beam output side of the laser beam source 70 to modulate the laser beam 72.

The laser beam 44 having passed through the dichroic mirror 75 and the laser beam 72 reflected by the dichroic mirror 75 are reflected by a rotatable polygonal mirror 81 to pass through a scanning lens 82 toward a dichroic mirror 84 which reflects the laser beam 44 but passes the laser beam 72 therethrough, the dichroic mirror 84 being inclined to the optical axis of the scanning lens 82. The laser beam 44 reflected by the dichroic mirror 84 is reflected by reflecting mirrors 86a, 86b so as to be applied to the stimulable phosphor layer 32 of the recording medium 16, and the laser beam 72 that has passed through the dichroic mirror 84 is reflected by reflecting mirrors 88a through 88c so as to be applied to the unexposed film F.

In operation, the laser beam source 42 of the reading unit 18 is energized to emit the laser beam 44 which passes through the dichroic mirror 75, is reflected by the polygonal mirror 81, and then passes through the scanning lens 82 to the dichroic mirror 84. The laser beam 44 s then reflected upwardly by the dichroic mirror 84 and reflected by the reflecting mirrors 86a, 86b to scan the stimulable phosphor layer 32 in the main scanning direction. The laser beam 72 emitted from the energized laser beam source 70 of the reproducing unit 24 is modulated by the light modulator 74. The modulated laser beam 72 is reflected by the dichroic mirror 75 to travel with the laser beam 44, and then reflected by the polygonal mirror 81 to go through the scanning lens 82. Thereafter, the laser beam 72 passes through the dichroic mirror 84, thus being separated from the laser beam 44, and is reflected by the reflecting mirrors 88a through 88c so that the laser beam 72 is applied to the unexposed film F.

In the arrangement of FIG. 2, the laser beam sources 42, 70 can be disposed closely to each other, and the polygonal mirror 81 and the scanning lens 82 are shared by the reading unit 18 and the reproducing unit 24. Therefore, the apparatus 10 with the optical system of FIG. 2 incorporated therein is of a smaller size.

While the laser beams 44, 72 of different wavelengths are combined and separated by the dichroic mirrors 75, 84 in this embodiment, the laser beams 44, 72 may be combined and separated by having the directions in which they are deflected extend perpendicularly to each other, as disclosed in Japanese Laid-Open Patent Publication No. 60-227218, or the laser beams 44, 72 may be applied to the polygonal mirror 81 along different optical paths. These two alternative arrangements for combining and separating two different laser beams are disclosed in Japanese Laid-Open Patent Publications Nos. 60-225117 and 55-101909.

Figure 3:
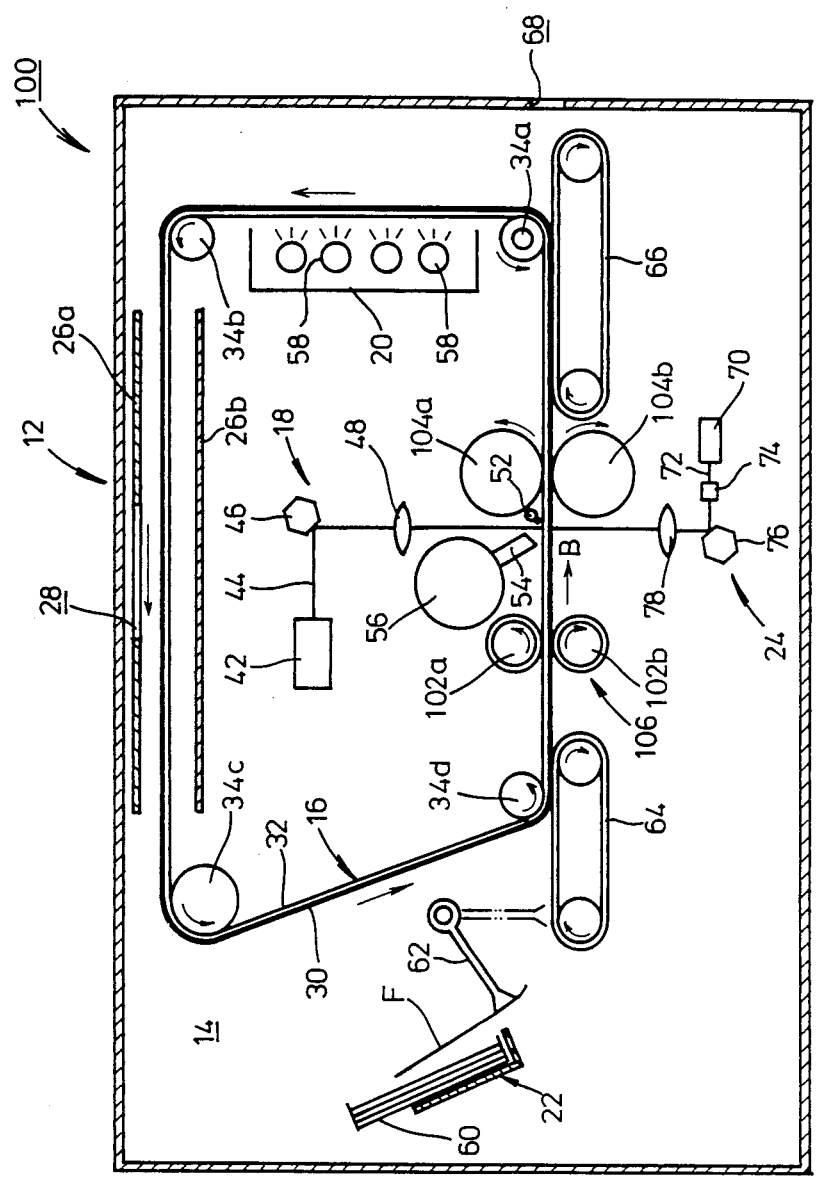
FIG. 3 is a schematic sectional elevational view of an apparatus for recording, reading, and reproducing radiation image information according to another embodiment of the present invention.

An apparatus for recording, reading, and reproducing radiation image information according to another embodiment of the present invention is shown in FIG. 3. Those parts of FIG. 3 which are identical to those of FIG. 1 are denoted by identical reference numerals and will not be described in detail.

The apparatus, generally denoted by 100, has an auxiliary scanning feed system 106 including a pair of nip rollers 102a, 102b and a pair of feed drive rollers 104a, 104b.

The nip rollers 102a, 102b are disposed at the lower run of the recording medium 16 and held in rolling contact with the opposite surfaces of the recording medium 16. The feed drive rollers 104a, 104b are also held in rolling contact with the opposite surfaces of the recording medium 16 in spaced relation to the nip rollers 102a, 102b. The drive rollers 104a, 104b can be rotated synchronously by a rotative drive source (not shown).

The roller 34a of the four rollers 34a through 34c which are held in rolling engagement with the inner surface of the recording medium 16 is operatively coupled to a rotative drive source (not shown) for circulating the recording medium 16 in the direction of the arrows. Between the rollers 34a, 34b, there is disposed an erasing unit 20 which houses a desired number of erasing light sources 58.

The supply unit 22 is positioned in a lefthand portion of the chamber 14. An unexposed film F taken out of the supply magazine 60 loaded in the supply unit 22 is fed to the auxiliary scanning feed system 106 by a first endless feed belt 62 extending horizontally and having an end held in sliding contact with the support member 30 of the recording medium 16. A second endless feed belt 66 is disposed near the drive roller 104b and has a portion held in sliding contact with the support member 30.

The apparatus 100 operates in substantially the same way as the apparatus 10 as described below.

The non-illustrated rotative drive source is energized to rotate the roller 34a counterclockwise in the direction of the arrow for thereby circulating the recording medium 16 trained therearound. When the area of the recording medium 16 which carries a radiation image of an object recorded thereon in the recording unit 12 reaches a position below the reading unit 18, the laser beam source 42 of the reading unit 18 is energized to apply the laser beam 44 to the recording medium 16 while being scanned in the main scanning direction. At this time, the drive rollers 104a, 104b are rotated in synchronism with each other to feed the recording medium 16 gripped between the drive rollers 104a, 104b and the nip rollers 102a, 102b in the auxiliary scanning direction of the arrow B. Therefore, the recording medium 16 is two-dimensionally scanned by the laser beam 44.

After the radiation image has been read in the reading unit 18, the recording medium 16 reaches the erasing unit 20 between the rollers 34a, 34b, and any remaining radiation image is erased from the stimulable phosphor layer 32 by light emitted from the erasing light sources 58.

The unexposed films F are taken, one at a time, out of the supply magazine 60 in the supply unit 22 by the suction cup 62 of the sheet feed mechanism. The film F from the supply magazine 60 is delivered to the first feed belt 64, and then fed into the nip roller 102b by being gripped between the first feed belt 64 and the recording medium 16. Thereafter, the film F is fed by the nip roller 102b, the drive roller 104b, and the recording medium 16 in the auxiliary scanning direction of the arrow B at a given speed. At the same time, the laser beam source 70 of the reproducing unit 24 is energized to reproduce the image on the entire surface of the film F.

The laser beams 44, 72 are applied to the recording medium 16 and the film F, respectively, at positions which are substantially equally spaced from the drive rollers 104a, 104b.

The film F with the image reproduced thereon passes through the reproducing unit 24 and is delivered by the second feed belt 66 via the outlet slot 68 to an automatic developing apparatus in which the image is developed in a suitable manner.

In this embodiment, the endless recording medium 16 with the stimulable phoshpor layer 32 is circulated in the apparatus 100 while radiation images are being successively recorded in the recording unit 12 and read in the reading unit 18. The unexposed film F is fed in the auxiliary scanning direction by one surface of the recording medium 16 while in driven contact therewith. Therefore, no special independent feed system is required for feeding the unexposed film F in the auxiliary scanning direction of the arrow B in order to scan the unexposed film F two-dimensionally for image reproduction thereon. As a consequence, the apparatus 100 is small in size and can be manufactured economically.

Figure 4:
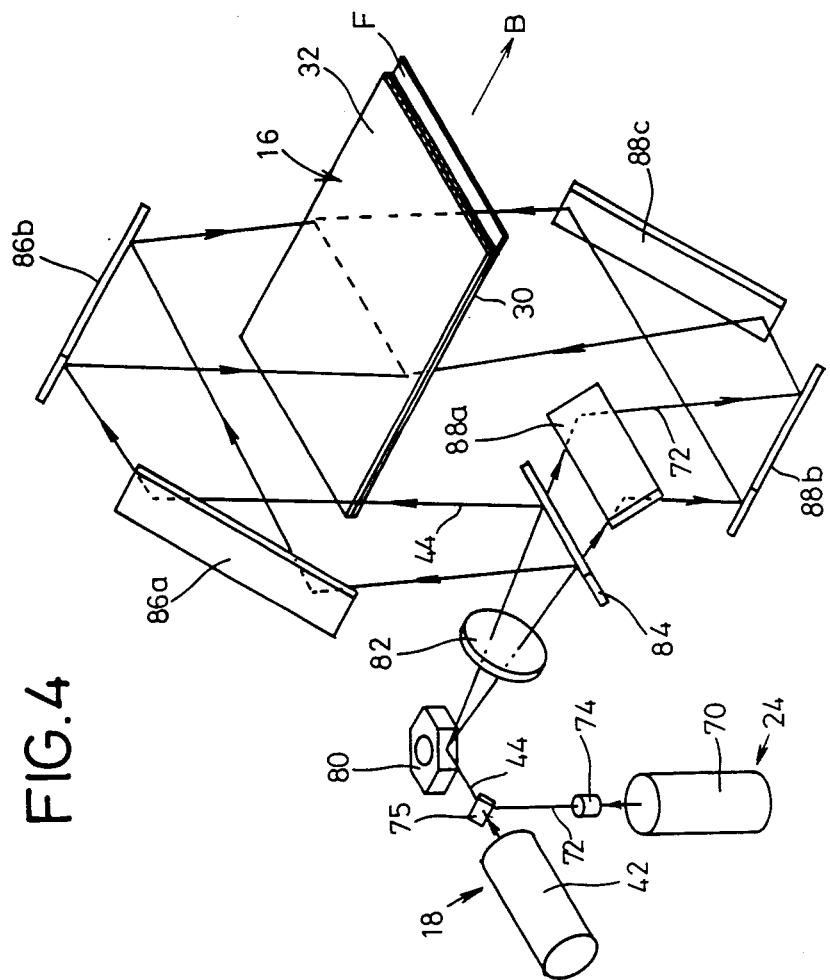
FIG. 4 is a perspective view of another scanning system which can be incorporated in the apparatus shown in FIG. 3.

In the apparatus 100, the reading unit 18 and the reproducing unit 24 may be arranged to share a common optical system as shown in FIG. 4. The reading unit 18 and the reproducing unit 24 are of the same arrangement as those in FIG. 2, and will not be described in detail.

Figure 5:
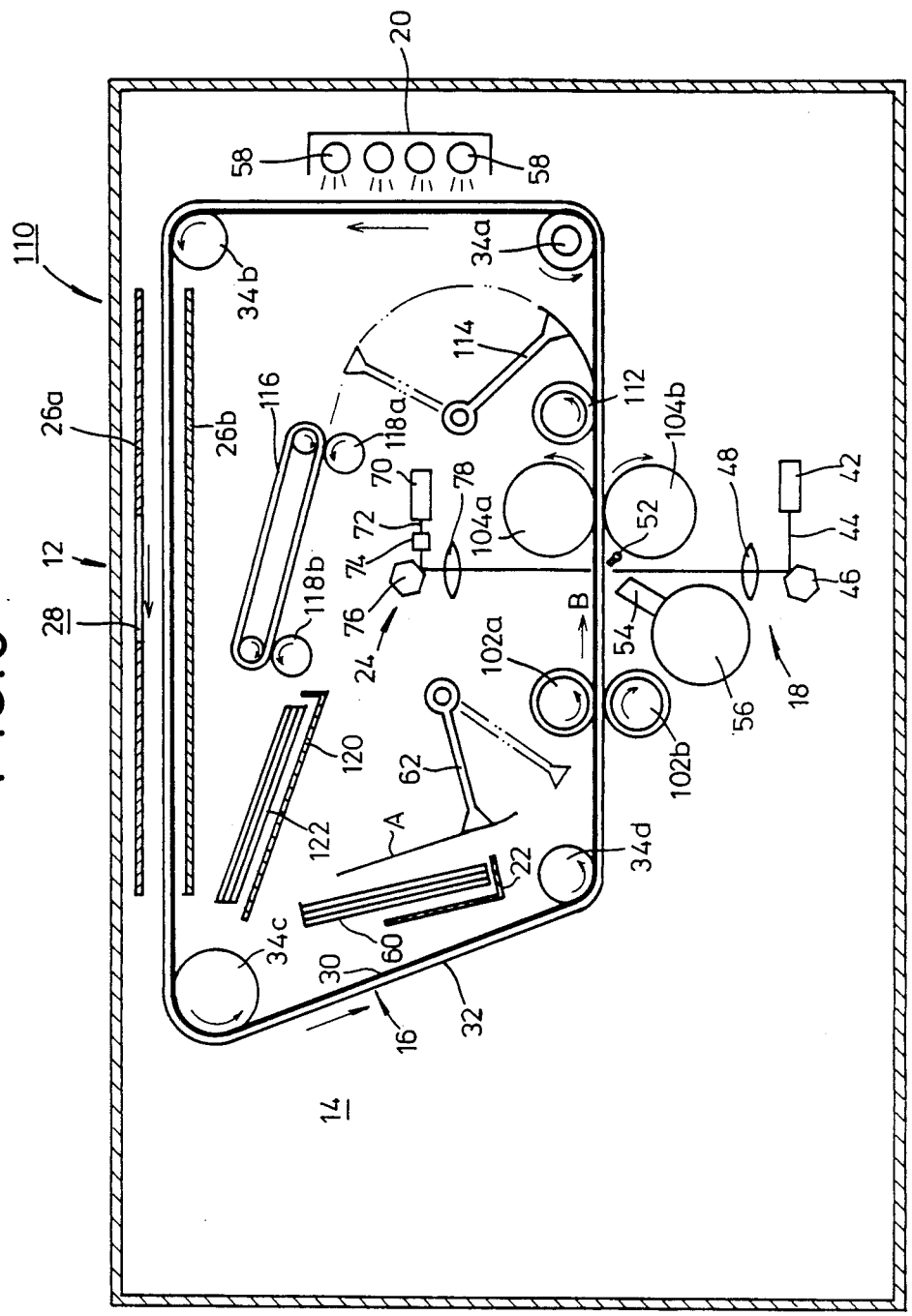
FIG. 5 is a schematic sectional elevational view of an apparatus for recording, reading, and reproducing radiation image information according to still another embodiment of the present invention.

An apparatus for recording, reading, and reproducing radiation image information according to still another embodiment of the present invention is shown in FIG. 5. Those parts of FIG. 5 which are identical to those of FIG. 3 are denoted by identical reference numerals and will not be described in detail.

In the apparatus, generally denoted at 110 in FIG. 5, the reading unit 18 is disposed outwardly of the recording medium 16, and the reproducing unit 24 is disposed inwardly of the recording medium 16. Therefore, the simulable phosphor layer 32 is fixed to the outer peripheral surface of the recording medium 16, and the erasing unit 20 is positioned outwardly of the recording medium 16.

The supply unit 22 is located inwardly of the recording medium 16. A nip roller 112 is rollingly held against the inner surface of the recording medium 16 in the vicinity of the drive roller 104a. A feed means including a suction cup 114 is swingably disposed near the nip roller 112. Above the suction cup 114, there are disposed an endless feed belt 116 and a pair of spaced nip rollers 118a, 118b held in rolling contact with the feed belt 116, A storage unit 120 is positioned near the nip roller 118b, with a receiving magazine 112 being detachably loaded in the storage unit 120.

The apparatus 110 operates in substantially the same manner as the apparatus 110 of FIG. 3 as follows:

A radiation image of an object is recorded on the recording medium 16 as it is circulated in the chamber 14. Thereafter, the recorded image information is photoelectrically read by the reading unit 18 disposed in a lower portion of the chamber 14. Then, the recording medium 16 from which the image information has been read passes through the erasing unit 20, whereupon the erasing light sources 58 are energized to erase any remaining radiation image from the stimulable phosphor layer 32, so that new radiation image information can be recorded again on the recording medium 16 in the recording unit 12.

The unexposed films F are taken, one at a time, out of the supply magazine 60 loaded inwardly of the recording medium 16 by the suction cup 62. The film F from the supply magazine 60 is fed in the auxiliary scanning direction of the arrow B by being gripped between the nip roller 102a, the drive roller 104a, and the support member 30 of the recording medium 16. At the same time, the reproducing unit 24 is energized to reproduce the image on the entire surface of the film F. The film F with the image reproduced thereon is attracted by the suction cup 114 and then gripped and fed by the feed belt 116 and the nip rollers 118a, 118b into the receiving magazine 122 loaded in the storage unit 120.

In the apparatus 110, the auxiliary scanning feed system for feeding the film F in the auxiliary scanning direction is simple in structure, and the reading and reproducing processes can simultaneously be effected by the reading unit 18 and the reproducing unit 24, respectively. It can readily be understood that the apparatus 110 offers the same advantages as those offered by the apparatus 10, 100 of the previous embodiments.

With the present invention, as described above, the recording medium is composed of the endless support member and the stimulable phosphor layer fixed thereto, and the recording medium is circulated in the apparatus for allowing radiation images to be repeatedly recorded on and read from the recording medium. When an image is to be reproduced on a recording sheet such as a photographic photosensitive material or the like in the reproducing unit, the recording medium and the recording sheet are fed in the respective auxiliary scanning directions by the common auxiliary scanning feed system. Therefore, the auxiliary scanning feed system is much simpler structurally than would be if independent auxiliary scanning systems were provided for feeding the recording medium and the recording sheet in the respective auxiliary scanning directions. The apparatus is thus small in size and can be manufactured economically.

Moreover, it is possible to read image information from the recording medium and reproduce image information on the recording sheet at the same time. Therefore, the process of recording a radiation image of an object reproducing image information of the same object can be carried out in one operation with high efficiency. Since a common optical system may be shared by the reading unit and the reproducing unit, the apparatus may be made smaller in size.

Furthermore, according to the present invention, the recording medium is composed of the endless support member and the stimulable phosphor layer fixed thereto, and the recording medium is circulated in the apparatus for allowing radiation images to be repeatedly recorded on and read from the recording medium. When an image is to be reproduced on a recording sheet such as a photographic photosensitive material or the like in the reproducing unit, the recording sheet is fed in the auxiliary scanning direction by one surface of the recording medium while in driven contact therewith. Consequently, no special independent feed system is required for feeding the recording sheet in the auxiliary scanning direction. As a consequence, the required feed system is simple in structure and the apparatus is of a small size.

Although certain preferred embodiments have been shown and described, it should be understood that many changes and modifications may be made therein without departing from the scope of the appended claims.

What is claimed is:

1. An apparatus for recording, reading, and reproducing radiation image information, comprising:
    a recording medium composed of an endless support member and a stimulable phosphor layer fixed thereto;
    recording means for applying a radiation bearing image information to said recording medium while in circulatory motion to record the image information on said recording medium;
    reading means for applying a light beam to said recording medium with said image information recorded thereon while deflecting the light beam in a main scanning direction and for photoelectrically reading said image information;
    erasing means for applying erasing light to said recording medium from which the image information has been read to erase remaining image information from said recording medium;
    reproducing means for applying a light beam modulated by said image information or other radiation image information to a recording sheet while deflecting the light beam in a main scanning direction to reproduce an image on said recording sheet; and
    an auxiliary scanning feed system for feeding said recording medium scanned in the main scanning direction by said reading means and said recording sheet scanned in the main scanning direction by said reproducing means, respectively in different first and second auxiliary scanning directions transverse to said main scanning directions.

2. An apparatus according to claim 1, wherein said auxiliary scanning feed system includes a rotatable drive drum, a pair of first nip rollers coacting with said drive drum for gripping and feeding said recording medium in said first auxiliary scanning direction, and a pair of second nip rollers coacting with said drive drum for gripping and feeding said recording sheet in said second auxiliary scanning direction different from said first auxiliary scanning direction.

3. An apparatus according to claim 2, wherein at least said first nip rollers are movable toward and away from said drive drum.

4. An apparatus according to claim 1, wherein said reading means and said reproducing means share a common optical system.

5. An apparatus according to claim 1, wherein said stimulable phosphor sheet is fixed to an inner peripheral surface of said endless support member, said support member being made of a material which is permeable to the radiation and impermeable to the light beam.

6. An apparatus for recording, reading, and reproducing radiation image information, comprising:
    a recording medium composed of an endless support member and a stimulable phosphor layer fixed thereto;
    recording means for applying a radiation bearing image information to said recording medium while in circulatory motion to record the image information on said recording medium;
    reading means for applying a light beam to said recording medium with said image information recorded thereon while deflecting the light beam in a main scanning direction and for photoelectrically reading said image information;
    erasing means for applying erasing light to said recording medium from which the image information has been read to erase remaining image information from said recording medium; and reproducing means for applying a light beam modulated by said image information or other radiation image information to a recording sheet while deflecting the light beam in a main scanning direction to reproduce an image on said recording sheet, said recording sheet being fed in an auxiliary scanning direction transverse to said last-mentioned main scanning direction by said recording medium while in circulatory motion.

7. An apparatus according to claim 6, further including a pair of feed drive rollers held in contact with opposite surfaces of said recording medium, one of said feed drive rollers and said recording medium coacting with each other for feeding said recording sheet in the auxiliary scanning direction.

8. An apparatus according to claim 7, wherein said reading unit and said reproducing unit are arranged to apply the light beams emitted respectively therefrom to said recording medium and said recording sheet at positions substantially equally spaced from said drive rollers, respectively.

9. An apparatus according to claim 6 or 8, wherein said reading means and said reproducing means share a common optical system.

10. An apparatus according to claim 6, wherein said support member is made of a light-shielding material.

* * * * *